United States Patent [19]

Cerulli et al.

[11] Patent Number: 5,362,324

[45] Date of Patent: Nov. 8, 1994

[54] ZERO SLUMP - LOSS SUPERPLASTICIZER

[75] Inventors: Tiziano Cerulli; Paolo Clemente; Mario Collepardi; Giorgio Ferrari; Pasquale Zaffaroni, all of Milan, Italy

[73] Assignee: MAPEI S.p.A., Milan, Italy

[21] Appl. No.: 201,377

[22] Filed: Feb. 24, 1994

[30] Foreign Application Priority Data

Feb. 25, 1993 [IT] Italy .................. MI93A000366

[51] Int. Cl.⁵ ............................. C04B 40/00
[52] U.S. Cl. ................ 106/823; 106/696; 106/724; 106/802; 106/819; 524/2; 524/650
[58] Field of Search ......... 106/696, 724, 802, 819, 106/823; 524/2, 650

[56] References Cited

U.S. PATENT DOCUMENTS

| | | | |
|---|---|---|---|
| 4,473,406 | 9/1984 | Bradley et al. | 106/823 |
| 4,792,360 | 12/1988 | Pierce et al. | 100/823 |
| 5,028,271 | 7/1991 | Huddleston et al. | 106/823 |
| 5,069,721 | 12/1991 | Tamura et al. | 106/724 |
| 5,085,701 | 2/1992 | Müller et al. | 106/823 |

*Primary Examiner*—Karl Group
*Assistant Examiner*—Michael Marcheschi
*Attorney, Agent, or Firm*—Griffin Butler Whisenhunt & Kurtossy

[57] ABSTRACT

A superplasticizing additive for concrete and other cementitious mixes with high retention of workability (low "slump loss") and low air-entraining effect, is made by terpolymers of a) (meth)acrylic acid and its salts, b)polyethyleneglycolmonomethylether-(meth)acrylate and c) polypropyleneglycol-di(meth)acrylate.

6 Claims, No Drawings

ZERO SLUMP - LOSS SUPERPLASTICIZER

BRIEF DESCRIPTION OF THE INVENTION

The present invention relates to a new superplasticizing additive for concrete and other cementitious materials capable to considerably increase the initial workability of the mixes and to maintain this workability for longer periods than those corresponding to the traditional superplasticizers and to allow an easy placing of the concrete. More particularly, the present invention relates to a superplasticizer with the above mentioned properties and further characterized by a low air-entraining effect and no adverse effect on the mechanical properties of the concrete, even at the early stage of curing.

DESCRIPTION OF THE STATE-OF-ART

Superplasticizers are extensively used in the construction industry because their addition considerably increases the fluidity of fresh concrete without adding more water to the mix. Furthermore, they allow a considerable reduction of the mixing water and an easy placing of high quality concretes which, once hardened, are characterized by high strength.

Traditional superplasticizers based on the condensation between formaldehyde and naphthalene sulfonic acid salts (NSFC) or melamine sulphite modified resins (MSFC) cannot maintain the workability of fresh mixes for long periods. So, even after few minutes, a sharp decrease of the fluidity can occur, known as "slump-loss" effect of the fresh concrete. When "slump-loss" occurs, the initial workability is normally restored at the site of placing by adding more water to the mix, with a consequent adverse effect on the mechanical properties and the durability of the hardened concrete.

Recently, "zero slump-loss" superplasticizers have been developed capable to maintain the same fluidity for longer periods and allow the transport of fresh concrete for long distances without further retempering the concrete at the placing-site. These new additives are based on crosslinked hydrophilic acrylic polymers which hydrolyze in the strong alkaline medium of cementitious mixes to produce linear polymer chains which reduce the "slump loss" effect.

Examples of such additives are described in Japanese Patent Application n. 281014, based on copolymers of (meth)acrylic acid, ethoxy esters of (meth)acrylic acid and a crosslinking monomer having the following general formula:

$$CH_2=\overset{X}{\underset{\underset{O}{\|}}{C}}-\overset{\|}{\underset{}{C}}-Y-\overset{X}{\underset{\underset{O}{\|}}{C}}-\overset{}{\underset{}{C}}=CH_2 \qquad (I)$$

where:

X represents hydrogen or methyl radical;

Y represents $-O-(R_1-)_n-O-$ radical ($R_1$ is an alkylene radical and n is integer from 2 to 30). In this case the crosslinking agents of formula (I) can be obtained by reacting (meth)acrylic acid and ethylene glycol ($R_1=CH_2$, n=2) or superior glycols (1,4-butanediol, 1,6-exanediol, 1,8-octanediol, etc. for n>2). Alternatively, Y may be a $-O-(R_{2a}-O-R_{2b}-)_n-O$ radical (with $R_{2a}$ and $R_{2b}$ $C_2-C_5$ alkylene radicals and n integer from 2 to 30).

In this case, the crosslinking agents of formula (I) can be obtained by reacting (meth)acrylic acid and polyglycolethers having alkylene radicals with at least 4 carbon atoms, according to the formula $-(-O-R_{2b}-R_{2a}-O-R_{2b}-R_{2a}-O-)-$. Examples of such compounds are those obtained by reacting (meth)acrylic acid and poly-tetramethyleneglycols (PTMEG) having general formula $HO-(CH_2CH_2CH_2CH_2O)_n-H$. Other crosslinking agents reported in Japanese Patent Application n. 281014 are ethylene-glycol-di(meth)acrylate (EG-DA), diethylene glycol di(meth)acrylate (2EG-DA) Triethylene glycol di(meth)acrylate (3EG-DA), 4-ethylene glycol di(meth)acrylate (5EG-DA), 9-ethylene glycol di(meth)acrylate (9EG-DA), 14-ethylene glycol di(meth)acrylate and their combination.

European Patent Application n. 448717A1 describes other crosslinking agents for the production of superplasticizers having low "slump-loss" effect. Such crosslinking agents are represented by the following formulas containing epoxy groups:

$$CH_2\underset{\diagdown O \diagup}{-}CH-CH_2-O-\overset{O}{\overset{\|}{C}}-(CH_2)_6-\underset{\underset{CH=CH_2}{|}}{CH}-CH_2-CH=CH-(CH_2)_6-\overset{O}{\overset{\|}{C}}-O-CH_2-\underset{\diagdown O \diagup}{CH}-CH_2$$

$$CH_2\underset{\diagdown O \diagup}{-}CH-CH_2-O-\overset{O}{\overset{\|}{C}}-(CH_2)_6-CH=CH-(CH_2)_6-\overset{O}{\overset{\|}{C}}-O-CH_2-\underset{\diagdown O \diagup}{CH}-CH_2$$

$$CH_2\underset{\diagdown O \diagup}{-}CH-CH_2-O-\overset{O}{\overset{\|}{C}}-\phantom{X}\underset{}{\bigcirc}\phantom{X}-O-CH_2-\underset{\diagdown O \diagup}{CH}-CH_2$$

$$CH_2\underset{\diagdown O \diagup}{-}CH-CH_2-O-\overset{O}{\overset{\|}{C}}-(CH_2)_5-\underset{\underset{CH_2-CH_3}{|}}{CH}-(CH_2)_6-\overset{O}{\overset{\|}{C}}-O-CH_2-CHCH_2\underset{\diagdown O \diagup}{}$$

$$CH_2\underset{\diagdown O \diagup}{-}CH-CH_2-O-\overset{O}{\overset{\|}{C}}-(CH_2)_6-\underset{\underset{CH_2-CH_3}{|}}{CH}-(CH_2)_9-\overset{O}{\overset{\|}{C}}-O-CH_2-CHCH_2\underset{\diagdown O \diagup}{}$$

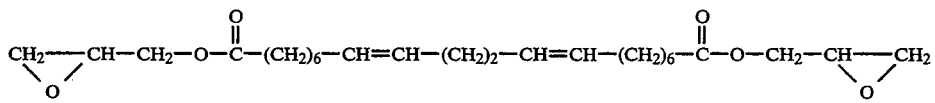

or by unsaturated monomers obtained by such epoxy compounds. A noteworthy drawback of this type of superplasticizers is the air-entraining effect they produce in the cement mixes, as already pointed out by V. S. Ramachandran (9th International Congress on the Chemistry of Cement, Vol. 1, pp. 529–568, 1992, New Delhi). This effect, besides causing a strength decrease, also affects the appearance of the concrete.

Just to reduce the air-entraining effect caused by these superplasticizers, European Patent Application n. 448717A1 recommends the use of highly hydrophilic monomers such as:

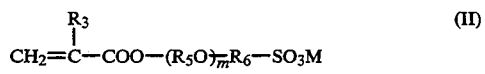

where:
R$_3$ is H or —CH$_3$;
R$_5$ and R$_6$ independently represent alkylene radicals containing from 2 to 4 carbon atoms.

Examples of such type of monomers (II) are, for example, 2-sulfoethyl(meth)acrylate, 2-sulfopropyl (meth)-acrylate, sulfoethoxypolyethylenglycol(meth)acrylate, sulfoethoxypolypropylenglycolmono(meth)acrylate, etc. and their salts.

In order to reduce the air-entraining effect of this type of polymers, in European Patent Application n. 0331308, is recommended the use of considerable amount (from 5 to 15 percent by weight of the monomers) of the following monomer:

where:
R$_2$ is H or CH$_3$

SUMMARY OF THE PRESENT INVENTION

The present invention relates to new crosslinked water soluble or water-dispersible acrylic polymers, which can find application as "zero slump-loss" superplasticizers, having different structures than those reported in the aforementioned patent applications.

Furthermore, the new additives of the present invention are characterized by a very low air-entraining effect, even in the absence of monomers of formulas (II) and (III), until now considered essential to produce superplasticizers with a low air-entraining effect.

The new crosslinked superplasticizers of the present invention are obtained by terpolymerization of the following monomers (IV), (V), (VI):

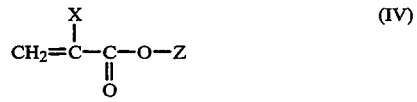

where Z=H, Na, K, Li, ½ Ca and X is H or CH$_3$, examples of such monomers are acrylic acid, methacrylic acid and their salts;

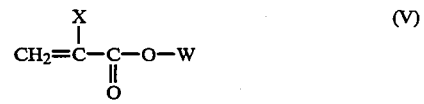

where W=—(—CH$_2$—CH$_2$—O—)$_n$—CH$_3$, n is integer from 2 to 30 and X is H or CH$_3$; these monomers comprise polyethyleneglycolsmonomethylether-(meth)acrylate with molecular weight from 200 to 2000; and

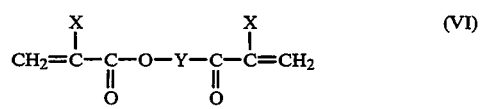

where

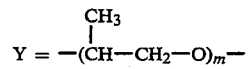

and m is an integer from 2 to 50. These monomers are preferably represented by polypropylene-glycol-di-(meth)acrylate with molecular weight of approximately between 280 and 3100, i.e. with m approximately between 2 and 50.

DETAILED DESCRIPTION OF THE PRESENT INVENTION

The main difference among the polymer of the present invention and those described in the aforementioned patent applications is the crosslinking agent. In fact, it has been surprisingly found that, in order to obtain "zero slump-loss" superplasticizers with low air-entraining effect, monomers having formula (VI) are necessary, in which Y represents propyloxy group

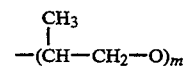

and m is an integer from 5 to 50. The monomers of the present invention are substantially different from those described in the previous patent applications, in which the special sulfonated monomer units reported in formulas II and III are essential to reduce the air entraining effect.

The acrylic crosslinked polymers of the present invention may be obtained by terpolymerizing, in different ratios, the monomers of the formulas (IV), (V), (VI). Even though many combinations are possible, it has been observed that the best results, in terms of loss of workability ("slump-loss") and air-entraining effect, are obtained when the amount of acrylic monomers (IV) and (V) is from 90 to 99.9 percent of the polymerizable mass and the amount of monomer (VI) is from 0.1 to 10 percent of the polymerizable mass.

The polymers of the present invention can be conveniently synthetized by many of the polymerisation methods known in the art. In the following examples, some preparations of polymers of the present invention are described.

EXAMPLE 1

648 g of water are charged in a glass bottom-rounded reactor equipped with mechanical stirrer, thermometer and reflux condenser. The system is purged with nitrogen and heated at 90° C. After the addition of 6.3 g of potassium persulfate $K_2S_2O_8$, a mixture of 28 g of methacrylic acid, 247 g of polyethyleneglycolmonomethylether methacrylate of molecular weight 818 and 7 g of polypropyleneglycoldimethacrylate of molecular weight 861 is added in one hour. The system is further kept at 90° C. for one hour and then neutralized with 60 g of a 30 percent solution of NaOH. About 990 g of an amber-coloured polymer solution are obtained, having a total solids content of 30 percent and a viscosity of about 300 cps at 20° C.

EXAMPLE 2

648 g of water are charged in a glass bottom-rounded reactor equipped with mechanical stirrer, thermometer and reflux condenser. The system is purged with nitrogen and heated at 90° C. After the addition of 6.3 g of potassium persulfate $K_2S_2O_8$, a mixture of 30 g of methacrylic acid, 251 g of polyethyleneglycolmonomethylether methacrylate of molecular weight 818 and 1 g of polypropyleneglycoldimethacrylate of molecular weight 861 is added in one hour. The system is further kept at 90° C. for one hour and then neutralized with 60 g of a 30 percent solution of NaOH. About 990 g of an amber-coloured polymer solution are obtained, having a total solids content of 30 percent and a viscosity of about 250 cps at 20° C.

EXAMPLE 3

648 g of water are charged in a glass bottom-rounded reactor equipped with mechanical stirrer, thermometer and reflux condenser. The system is purged with nitrogen and heated at 90° C. After the addition of 6.3 g of potassium persulfate $K_2S_2O_8$, a mixture of 25 g of methacrylic acid, 229 g of polyethyleneglycolmonomethylether methacrylate of molecular weight 818 and 28 g of polypropyleneglycoldimethacrylate of molecular weight 861 is added in one hour. The system is further kept at 90° C. for one hour and then neutralized with 60 g of a 30 percent solution of NaOH. About 990 g of an amber-coloured polymer solution are obtained, having a total solids content of 30 percent and a viscosity of about 400 cps at 20° C.

EXAMPLE 4

This example describes a polymer synthetized using a crosslinking agent (14-ethyleneglycoldimethacrylate) selected among those indicated in the Japanese Patent Application n. 281014. The polymer so obtained has been used in concrete tests in comparison with the polymers of the present invention.

648 g of water are charged in a glass bottom-rounded reactor equipped with mechanical stirrer, thermometer and reflux condenser. The system is purged with nitrogen and heated at 90° C. After the addition of 6.3 g of potassium persulfate $K_2S_2O_8$, a mixture of 28 g of methacrylic acid, 247 g of polyethyleneglycolmonomethylether methacrylate of molecular weight 818 and 7 g of polyethyleneglycoldimethacrylate of average molecular weight 770 (14EG-DMA) is added in one hour. The system is further kept at 90° C. for one hour and then neutralized with 60 g of a 30 percent solution of NaOH. About 990 g of an amber-coloured polymer solution are obtained, having a total solids content of 30 percent and a viscosity of about 350 cps at 20° C.

EXAMPLE 5

This example reports the results of concrete tests made using the polymers of the present invention (Examples 1, 2 and 3) as superplasticizer in comparison both to a traditional superplasticizer based on naphthalene sulfonated formaldehyde condensate (NSFC) and a polymer synthetized using 14-ethyleneglycoldimethacrylate as crosslinking agent (14 EG-DMA) selected among those described in the Japanese Patent Application n. 281014 (Example 4). All the concretes were prepared with the same water/cement and aggregate/cement ratios, using Type I Portland cement (400 kg/mc) and coarse aggregate with maximum diameter of 20 mm. The comparative results of the concrete tests are reported in the following table.

TABLE 1

Comparative concrete tests using the additive of the present invention (Example 1, Example 2, Example 3) and a traditional superplasticizer based on naphthalene sulfonated formaldehyde condensate (NSFC) and a polymer obtained by using the crosslinking agents described in the Japanese Patent Application n. 281014 (Example 4).

Type of cement: Portland Type I.
Dosage of cement: 400 kg/cubic meter.
Coarse aggregate maximum diameter: 20 mm.
Water/cement ratio: 0.42.
Dosage of the different additives:

Example 1: 0.25% active matter by weight of cement;
Example 2: 0.25% active matter by weight of cement;
Example 3: 0.25% active matter by weight of cement;
Example 4: 0.25% active matter by weight of cement;
NSFC: 0.50% active matter by weight of cement.

| TYPE OF ADDITIVE | AIR CONTENT (%) | SLUMP (mm) | | | | COMPRESSIVE MECHANICAL STRENGTH (MPa) | | |
|---|---|---|---|---|---|---|---|---|
| | | after mixing | after 15 min | after 30 min | after 45 min | 1 day | 7 days | 28 days |
| EXAMPLE 1 | 2.1 | 240 | 220 | 220 | 185 | 21 | 37 | 48 |
| EXAMPLE 2 | 3.0 | 230 | 220 | 210 | 180 | 18 | 35 | 46 |

TABLE 1-continued

Comparative concrete tests using the additive of the
present invention (Example 1, Example 2, Example 3)
and a traditional superplasticizer based on
naphthalene sulfonated formaldehyde condensate
(NSFC) and a polymer obtained by using the
crosslinking agents described in the Japanese Patent
Application n. 281014 (Example 4).

Type of cement: Portland Type I.
Dosage of cement: 400 kg/cubic meter.
Coarse aggregate maximum diameter: 20 mm.
Water/cement ratio: 0.42.
Dosage of the different additives:

Example 1: 0.25% active matter by weight of cement;
Example 2: 0.25% active matter by weight of cement;
Example 3: 0.25% active matter by weight of cement;
Example 4: 0.25% active matter by weight of cement;
NSFC: 0.50% active matter by weight of cement.

| TYPE OF ADDITIVE | AIR CONTENT (%) | SLUMP (mm) | | | | COMPRESSIVE MECHANICAL STRENGTH (MPa) | | |
|---|---|---|---|---|---|---|---|---|
| | | after mixing | after 15 min | after 30 min | after 45 min | 1 day | 7 days | 28 days |
| EXAMPLE 3 | 1.9 | 170 | 150 | 140 | 135 | 22 | 37 | 50 |
| EXAMPLE 4 | 6.5 | 240 | 225 | 210 | 185 | 16 | 33 | 44 |
| NSFC | 2.1 | 180 | 120 | 80 | 60 | 22 | 38 | 47 |

The results of concrete tests of Table 1 clearly indicate that the fluidifying effect of the crosslinked polymer of the present invention (Examples 1, 2, 3) is much higher than that of the commercial additive based on naphthalene sulfonate (NSFC). In fact, the initial value of the fluidity of the concrete mixes (measured by "slump" test) containing the polymers of the present invention, even though at a dosage 50% less than NSFC, is higher or, at least comparable, with the mix containing NSFC.

Furthermore, the crosslinked acrylic polymer of the present invention (Examples 1, 2, 3) shows an excellent retention of the workability (very low "slump-loss"). So, results of Table 1 indicate that, even 45 minutes after the mixing, the concrete mixes additivated with the polymers of the present invention retain 80 percent of the initial "slump" value, while the "slump" of the concrete mix containing NSFC drops at 50 percent of its initial value.

Also the air-entraining effect of the polymers of the present invention (Examples 1, 2, 3) is surprisingly low in comparison to the polymer of Example 4, which has been synthetized using polyethyleneglycoldimethacrylate (14EG-DMA) as crosslinking agent, as reported in Japanese Patent Application n. 281014.

Therefore, the crosslinking agent of the present invention, based on polypropyleneglycoldi(meth)acrylate, allows preparing cementitious mixes with a low air content without requiring the monomers described in the European Patent Applications n. 448717A and n. 0331308, which up to now were belived necessary in order to produce polymer superplasticizers characterized by a low air-entraining effect.

EXAMPLE 6

In this example the polymer of the present invention has been evaluated as superplasticizer for High Alumina cement based mortars. It is common knowledge that traditional superplasticizers like NSFC (Naphthalene Sulfonated Formaldehyde Condensate and MSFC (Melamine Sulfite Formaldehyde Condensate) do not exert significant fluidifying effect on high alumina cement. The results of this example (see Table 2) surprisingly show that the polymer of the present invention, even at an exceptionally low dosage, exerts an excellent superplasticizing effect and retain the workability of the mixes based on High Alumina cement and do not cause any decrease in the strength developments.

TABLE 2

Comparative mortar tests using the additive of the
present invention (Example 1, Example 2, Example 3)
and a traditional superplasticizer based on
naphthalene sulfonated formaldehyde condensate
(NSFC).

Type of cement: high Alumina cement (Ciment Fondu, Lafarge)
Sand/Cement ratio: 2.0
Water/Cement ratio: 0.30
Dosage of the different additives:

Example 1: 0.1% active matter by weight of cement
Example 2: 0.1% active matter by weight of cement
Example 3: 0.1% active matter by weight of cement
NSFC: 0.5% active matter by weight of cement

| TYPE OF ADDITIVE | AIR CONTENT (%) | FLUIDITY (%) (flow table measurement) | | | | COMPRESSIVE MECHANICAL STRENGTH (MPa) | | |
|---|---|---|---|---|---|---|---|---|
| | | after mixing | after 15 min | after 30 min | after 45 min | 1 day | 7 days | 28 days |
| PLAIN | 4.8 | 15 | 15 | 12 | 10 | 78 | 102 | 111 |
| EXAMPLE 1 | 5.0 | 140 | 140 | 130 | 125 | 81 | 100 | 110 |

TABLE 2-continued

Comparative mortar tests using the additive of the present invention (Example 1, Example 2, Example 3) and a traditional superplasticizer based on naphthalene sulfonated formaldehyde condensate (NSFC).

Type of cement: high Alumina cement (Ciment Fondu, Lafarge)
Sand/Cement ratio: 2.0
Water/Cement ratio: 0.30
Dosage of the different additives:
Example 1: 0.1% active matter by weight of cement
Example 2: 0.1% active matter by weight of cement
Example 3: 0.1% active matter by weight of cement
NSFC: 0.5% active matter by weight of cement

| TYPE OF ADDITIVE | AIR CONTENT (%) | FLUIDITY (%) (flow table measurement) | | | | COMPRESSIVE MECHANICAL STRENGTH (MPa) | | |
|---|---|---|---|---|---|---|---|---|
| | | after mixing | after 15 min | after 30 min | after 45 min | 1 day | 7 days | 28 days |
| EXAMPLE 2 | 4.9 | 135 | 135 | 130 | 120 | 80 | 99 | 105 |
| EXAMPLE 3 | 5.0 | 132 | 130 | 125 | 118 | 82 | 102 | 109 |
| NSFC | 6.5 | 25 | 15 | 15 | 15 | 78 | 102 | 112 |

We claim:

1. Superplasticizing additive for concrete and other cementitious mixes with high retention of workability and low air-entraining effect, comprising terpolymers of the following mixture of monomers respectively having formulas IV, V and VI

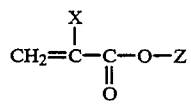
(IV)

where Z=H, Na, Li, ½Ca and X is H or CH$_3$;

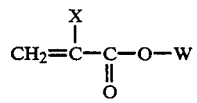
(V)

where W=—(—CH$_2$—CH$_2$—O—)$_n$—CH$_3$, n is an integer from 8 to 50 and X is H or CH$_3$;

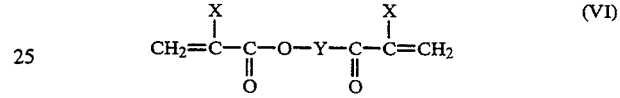
(VI)

where

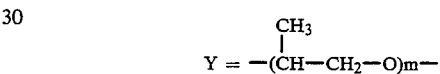

and m is an integer from 2 and 50.

2. Superplasticizing additive according to claim 1, wherein the monomer of formula V is polyethyleneglycolmonomethylether-(meth)acrylate of molecular weight from about 200 to about 2000.

3. Superplasticizing additive according to claim 1, wherein the monomer of formula VI is polypropyleneglycol-di-(meth)acrylate of molecular weight between about 280 and about 3100.

4. Superplasticizing additive according to claim 1, wherein the amount of acrylic monomers (IV) and (V) ranges from 90 to 99.9 percent of the whole polymerized mass and the amount of monomer (VI) ranges from 0.1 to 10 percent of the whole polymerized mass.

5. Cementitious mixes containing from 0.01 to 3.00 percent by weight of the cement, on a dry basis of the additive of the claim 1.

6. Cementitious mixes according to claim 5, wherein the cement used is high alumina cement.

* * * * *